United States Patent
Dankovich et al.

(10) Patent No.: US 12,234,608 B2
(45) Date of Patent: Feb. 25, 2025

(54) SUBSTRATES WITH METAL NANOPARTICLES, RELATED ARTICLES, AND A CONTINUOUS PROCESS FOR MAKING SAME

(71) Applicant: Folia Water, Inc., Pittsburgh, PA (US)

(72) Inventors: Theresa Dankovich, Pittsburgh, PA (US); Jonathan Levine, Pittsburgh, PA (US); Cantwell George Carson, Pittsburgh, PA (US)

(73) Assignee: Folia Water, Inc., Pittssburgh, PA (US)

( * ) Notice: Subject to any disclaimer, the term of this patent is extended or adjusted under 35 U.S.C. 154(b) by 0 days.

(21) Appl. No.: 16/069,595

(22) PCT Filed: Jan. 14, 2017

(86) PCT No.: PCT/US2017/013608
§ 371 (c)(1),
(2) Date: Jul. 12, 2018

(87) PCT Pub. No.: WO2017/124057
PCT Pub. Date: Jul. 20, 2017

(65) Prior Publication Data
US 2019/0242064 A1     Aug. 8, 2019

Related U.S. Application Data

(60) Provisional application No. 62/278,748, filed on Jan. 14, 2016.

(51) Int. Cl.
  *D21H 19/38*  (2006.01)
  *B01D 39/18*  (2006.01)
  (Continued)

(52) U.S. Cl.
  CPC ............ *D21H 19/38* (2013.01); *B01D 39/18* (2013.01); *C02F 1/001* (2013.01); *C02F 1/50* (2013.01);
  (Continued)

(58) Field of Classification Search
  None
  See application file for complete search history.

(56) References Cited

U.S. PATENT DOCUMENTS

| | | | | |
|---|---|---|---|---|
| 3,305,435 A | * | 2/1967 | Williston | ............... D21H 17/23 162/117 |
| 2002/0062938 A1 | * | 5/2002 | Westman | ............... D21H 21/52 162/206 |

(Continued)

FOREIGN PATENT DOCUMENTS

| CN | 1643206 A | 7/2005 |
|---|---|---|
| CN | 105723027 A | 6/2016 |

(Continued)

OTHER PUBLICATIONS

Theresa A. Dankovich, Microwave-assisted incorporation of silver nanoparticles in paper for point-of-use water purification, Environ. Sci.: Nano, 2014,1, 367-378 (Year: 2014).*

(Continued)

*Primary Examiner* — Jason M Greene
*Assistant Examiner* — Eric J McCullough
(74) *Attorney, Agent, or Firm* — Offit Kurman; Gregory Grissett

(57) ABSTRACT

An embodiment of the present disclosure is a method for forming a substrate. The method includes applying an aqueous solution of nanoparticle precursors to an assembly of fibers, wherein the nanoparticle precursors include a metal salt and a reducing agent. The method also includes drying the assembly of fibers with thermal energy in a continuous (Continued)

operation to form the substrate, thereby drying gives rise to metal nanoparticles in the substrate. The metal nanoparticles have a size that ranges from 1 to about 200 nanometers in at least one dimension.

40 Claims, 6 Drawing Sheets

(51) Int. Cl.
  *C02F 1/00*  (2023.01)
  *C02F 1/50*  (2023.01)
  *C09D 5/14*  (2006.01)
  *C09D 7/63*  (2018.01)
  *D06M 11/83*  (2006.01)
  *D06M 13/148*  (2006.01)
  *D06M 16/00*  (2006.01)
  *D21H 19/46*  (2006.01)
  *D21H 21/36*  (2006.01)
  *D21H 27/08*  (2006.01)

(52) U.S. Cl.
  CPC ............... *C02F 1/505* (2013.01); *C09D 5/14* (2013.01); *C09D 7/63* (2018.01); *D06M 11/83* (2013.01); *D06M 13/148* (2013.01); *D06M 16/00* (2013.01); *D21H 19/46* (2013.01); *D21H 21/36* (2013.01); *D21H 27/08* (2013.01); *B01D 2239/0407* (2013.01); *B01D 2239/0442* (2013.01); *B01D 2239/0464* (2013.01); *B01D 2239/10* (2013.01); *C02F 2201/008* (2013.01); *C02F 2303/04* (2013.01); *C02F 2305/08* (2013.01); *D10B 2201/01* (2013.01); *D10B 2401/13* (2013.01); *D10B 2505/04* (2013.01)

(56) References Cited

U.S. PATENT DOCUMENTS

| | | | | |
|---|---|---|---|---|
| 2005/0032226 | A1* | 2/2005 | Natan | ................... B01J 13/0047 506/4 |
| 2008/0279960 | A1* | 11/2008 | Burton | ................... A61L 15/18 424/618 |
| 2010/0098877 | A1* | 4/2010 | Cooper | ................ B01D 71/022 427/551 |
| 2010/0307341 | A1* | 12/2010 | Peter | ................ A61M 16/0808 96/7 |
| 2013/0319931 | A1 | 12/2013 | Liu et al. | |
| 2015/0336804 | A1 | 11/2015 | Dankovich | |
| 2016/0208430 | A1* | 7/2016 | Duffy | .................... A61L 15/225 |

FOREIGN PATENT DOCUMENTS

| | | | | |
|---|---|---|---|---|
| EP | 3061848 | A1 | 8/2016 | |
| GB | 2518430 | A | 3/2015 | |
| JP | 2008202159 | A | 9/2008 | |
| WO | 2003080911 | A2 | 10/2003 | |
| WO | WO-03080911 | A2 * | 10/2003 | ............ D02G 3/449 |
| WO | 2008027530 | A1 | 3/2008 | |
| WO | 2009132798 | A1 | 11/2009 | |
| WO | 2015040435 | A1 | 3/2015 | |
| WO | 2015060342 | A1 | 4/2015 | |

OTHER PUBLICATIONS

Officer: Armin Zellner, International Search Report and the Written Opinion, Completed Mar. 28, 2017, 12 pp.
Chinese First Action, including translation, Chinese Patent Application 201780008316, Jan. 20, 2021, 12 pp.
Controller of Patents: Reena Singh, India First Examination, India Patent Application 201817027215, Jul. 23, 2020, 4 pp.
Japanese First Action, including translation, Japanese Patent Application 2018-555844, Jan. 20, 2021, 8 pp.
Theresa A. Dankovich, Microwave-assisted incorporation of silver nanoparticles in paper for point-of-use water purification, Environmental Science, Royal Society of Chemistry, Published Jun. 20, 2014, pp. 367-378.
Chinese Second Action, including translation, Japanese Patent Application 2018-555844, Jun. 3, 2021, 15 pp.
Second Office Action, Chinese co-pending patent applicaiton 201780008316.7, Sep. 8, 2021, 12 pp.
Dankovich et al., Bactericidal Paper Impregnated with Silver Nanoparticles for Point-of-Use Water Treatment, ACS Publications, 2011 American Chemical Society, Environmental Science Technology, 2011, pp. 1992-1998.

* cited by examiner

SUBSTRATES WITH METAL NANOPARTICLES, RELATED ARTICLES, AND A CONTINUOUS PROCESS FOR MAKING SAME

CROSS-REFERENCE TO RELATED APPLICATIONS

The present application claims the benefit of and priority to PCT Application No. PCT/US2017/013608, filed Jan. 14, 2017, which claims the benefit of and priority to U.S. Provisional Patent Application Ser. No. 62/278,748, filed Jan. 14, 2016, the entire disclosures of which is incorporated by reference into this application for all purposes.

TECHNICAL FIELD

The present disclosure relates to a substrate that includes metal nanoparticles and a continuous process whereby in situ synthesis and immobilization of metal nanoparticles on the substrate occurs during the manufacturing process.

BACKGROUND

The lack of clean drinking water in many rural communities throughout the world is a significant human-health concern. Point-of-use (POU) water purification, for example, offers an affordable and convenient way to reduce exposure to pathogenic microorganisms (Clasen, 2010). Metal nanoparticles embedded in paper products have great potential to improve filtration of water. Previous methods for adding metal nanoparticles to cellulosic substrates are primarily bench-top batch methods. In such methods, nanoparticles are formed in situ batch-wise on the substrate or pre-formed nanoparticles are attached to a modified surface of cellulosic fibers (Dankovich, 2014, Wan et al, 2013 and Liu et al 2013).

Previously used batch methods are complex and time consuming. Typically, pre-cut paper is treated in separate treatment steps with various individual aqueous solutions. The treated papers are heated in an oven at a specified temperature for minutes to hours. After removal from the oven, the treated papers are washed and dried again to remove excess water before being ready for storage and application (Dankovich, 2014).

Batch methods use surface treatments, such as oxidation, to increase metal uptake of cellulosic substrates (Wan et al, 2013) and epoxy linkers on cellulosic substrates (Liu et al 2013) to bind the nanoparticle the cellulosic fibers. Such batch methods are applicable to very thin paper with a low basis weight and introduced the nanoparticles to only one side of the paper. Dispersion spray techniques that apply silver nanoparticles often results in particle aggregations, which can lead to irregular distribution of nanoparticles on the surface of the paper. Furthermore, the batch methods do not thoroughly coat the paper fibers in the interior of a thick paper, which is a disadvantage for many applications, where nanoparticle fiber coatings need to be distributed throughout the entire paper. In addition, the pre-formed nanoparticles do not adhere strongly to the cellulosic fibers surfaces without prior surface treatment steps, such as oxidation (Wan et al, 2013 and Liu et al 2013). Surface oxidative processes can result in undesirable paper properties by altering the pore structure and hydrogen bonding during paper formation, which can result in significant irregularities in the paper specifications. Use of linker chemicals and surface oxidation to the cellulose surface in order to strongly adhering metal nanoparticles to the material has not been demonstrated to be scalable to paper machine production. Use of linker technologies, in particular, are quite expensive to manufacture and utilize costly raw materials.

Paper formation processes are amenable to technologies used in conventional batch processes. For instance, altering the surface chemistry of the cellulose pulp may have a detrimental effect on the paper forming process. Because paper formation often relies on specific colloidal chemistry of a dispersion of cellulose pulp in an aqueous solution, surface modifications needed for nanoparticle adhesion may result in an inferior paper due to reductions strength or flexibility of the paper substrate. In particular, small changes in the surface chemistry of the cellulose pulp can negatively affect the levels of hydrogen bonding in the paper formation, which directly lead to weaker bonds between the wood pulp fibers and a weaker paper (Roberts, J. C. 1996). The batch methods and chemistries described above are not suitable for continuous processing used throughout the pulp and paper industry. The process dynamics are very different in a continuous paper formation processes, which yield rolls weighing in the tons, span over 3 meters width and can be kilometers in length. As mentioned above, batch methods presume the existence of an untreated paper that has been pre-cut to a sheet size. Although a larger paper size can be treated using previously disclosed methods, it has not been possible to use the previously batch methods to treat industrial scale paper rolls. Batch methods are more costly than continuous processes, the commercial application of nanotechnology to paper products has been limited.

One so-called continuous processes for forming cellulosic substrates may include spray application of pre-formed nanoparticles onto paper (Miekisz Jerzy, R., et al, 2015). This particular method, however, applies preformed, already synthesized, nanoparticles onto a thin cellulosic web. Applying preformed nanoparticles onto such a cellulosic web, without any surface pre-treatment, allows the nanoparticles to be easily dislodged and release at too high levels for long-term efficacy. Furthermore, this can cause too high of release to be suitable for use as filters for drinking water.

Exemplary background literature related to metal nanoparticle formation cited in the present disclosure is as follows. Throughout the disclosure, the citation format used through the disclosure is "author, year" from the following list: Clasen, T, 2010. Household Water Treatment and the Millennium Development Goals: Keeping the Focus on Health, Environ. Sci. Technol. 44(19), 7357-7360; Dankovich, T. A., Gray, D. G., 2011. Bactericidal Paper Impregnated with Silver Nanoparticles for Point-of-Use Water Treatment. Environ. Sci. Technol. 45(5), 1992-1998; Dankovich, T. A., Levine, J. S., Potgieter, N., Dillingham, R., and Smith, J. A. 2015. Inactivation of bacteria from contaminated streams in Limpopo, South Africa by silver- or copper-nanoparticle paper filters, ES: Water Research and Technol, DOI: 10. 1039/C5EW00188A; Dankovich, T. A. "Compositions and methods for preparing copper-containing paper and uses thereof" Patent Application, filed May 22, 2015. U.S. Ser. No. 62/001,682, U.S. Patent App. Pub. No US 2015/0336804 A1; Dankovich, T. A., Smith, J. A. Incorporation of copper nanoparticles into paper for point-of-use water purification. Water Research. 63, 245-251; Dankovich, T. A. 2014. Microwave-assisted incorporation of silver nanoparticles in paper for point-of-use water purification, ES Nano 1(4), 367; Liu, H., Jin, Z., Liu, Y., Method of forming and immobilizing metal nanoparticles on substrates and the use thereof, U.S. Patent App. Pub. No 2013/0319931 A1; Miekisz Jerzy, R., Boczek Slawomir, L., Helfojer Tomasz, S., A method of making paper antibacterial and apparatus for the production of paper antibacterial, PAT.219092. 31.03.2015 WUP 03/15; Roberts, J. C. The Chemistry of Paper. RSC Paperbacks. 1996, pp 56-68; and Wan, W., Guhados, G. Feb. 5, 2013. Nano-silver coated bacterial cellulose, U.S. Pat. No. 8,367,089 B2.

SUMMARY

There is a long felt need for substrates that include embedded metal nanoparticles and a continuous processes for forming such substrates. The present disclosure includes inventive concepts that transfer technology from the bench-top batch methods to continuous processing lines. An embodiment of the present disclosure is a method for forming a substrate. The method includes applying an aqueous solution of nanoparticle precursors to an assembly of fibers, wherein the nanoparticle precursors include a metal salt and a reducing agent. The method also includes drying the assembly of fibers with thermal energy in a continuous operation to form the substrate, thereby drying gives rise to metal nanoparticles in the substrate. The metal nanoparticles have a size that ranges from 1 to about 200 nanometers in at least one dimension.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

Embodiments of the present disclosure include a substrate with metal nanoparticles, synthesizing metal nanoparticles on the substrate in a continuous process, and related articles, devices and uses for such a substrate. Synthesis of the metal nanoparticles occurs in situ on the fiber surfaces in a continuous, industrial scaled, and/or scalable process. The output may be a roll of a substrate, from which smaller articles can be cut for use and/or incorporation into other articles or devices. The substrates and embedded metal nanoparticles may be used as a filter paper in a point-of-use (POU) water purification system. The substrates may also be used in other applications, including but not limited to, healthcare product, food packaging product, in catalytic processes, and adsorptive processes.

An embodiment of the present disclosure is a substrate including fibers consolidated together and a plurality of metal nanoparticles in the substrate. A substrate formed according to the inventive concepts disclosed herein can be a cellulosic substrate formed from cellulosic fibers or cellulosic materials. The cellulosic fibers may be wood pulp, cotton, rayon, or any other cellulosic material, whether naturally derived or synthetic. In one example, the cellulosic fiber is wood pulp used to form paper. However, the substrate may be formed from other fibers, such as polymer fibers. As such the substrate may include nonwoven and/or textile materials made from non-cellulosic fibers and/or a blend of cellulosic and non-cellulosic fibers. Exemplary polymer fibers include, but are not limited to, polyethylene terephthalate, polyamide, polypropylene, polyethylene, and poly lactic acid. Accordingly, the substrate as used herein may include a cellulosic substrate, such as paper, a textile material, a non-woven material, and/or laminates thereof. For example, substrates may include, but are not limited to paper, filter paper, blotting paper, tissue paper, paper towels, absorbent pads, cellulosic textiles (e.g. cotton and/or rayon textiles), and/or non-woven cellulosic textiles, nonwoven materials (e.g. spundbond, meltblown, spunbond-meltblown laminates, spun-laced, drylaid, and/or wetlaid nonwovens). As discussed elsewhere, the substrates may be used for filters. Exemplary filter media materials also include regenerated cellulose, cellulose acetate, cellulose triacetate, glass fibers, carbon fibers, polyethylene terephthalate fibers, polypropylene fibers, polyethylene fibers, and polyethersulfone membranes.

Figure 6:
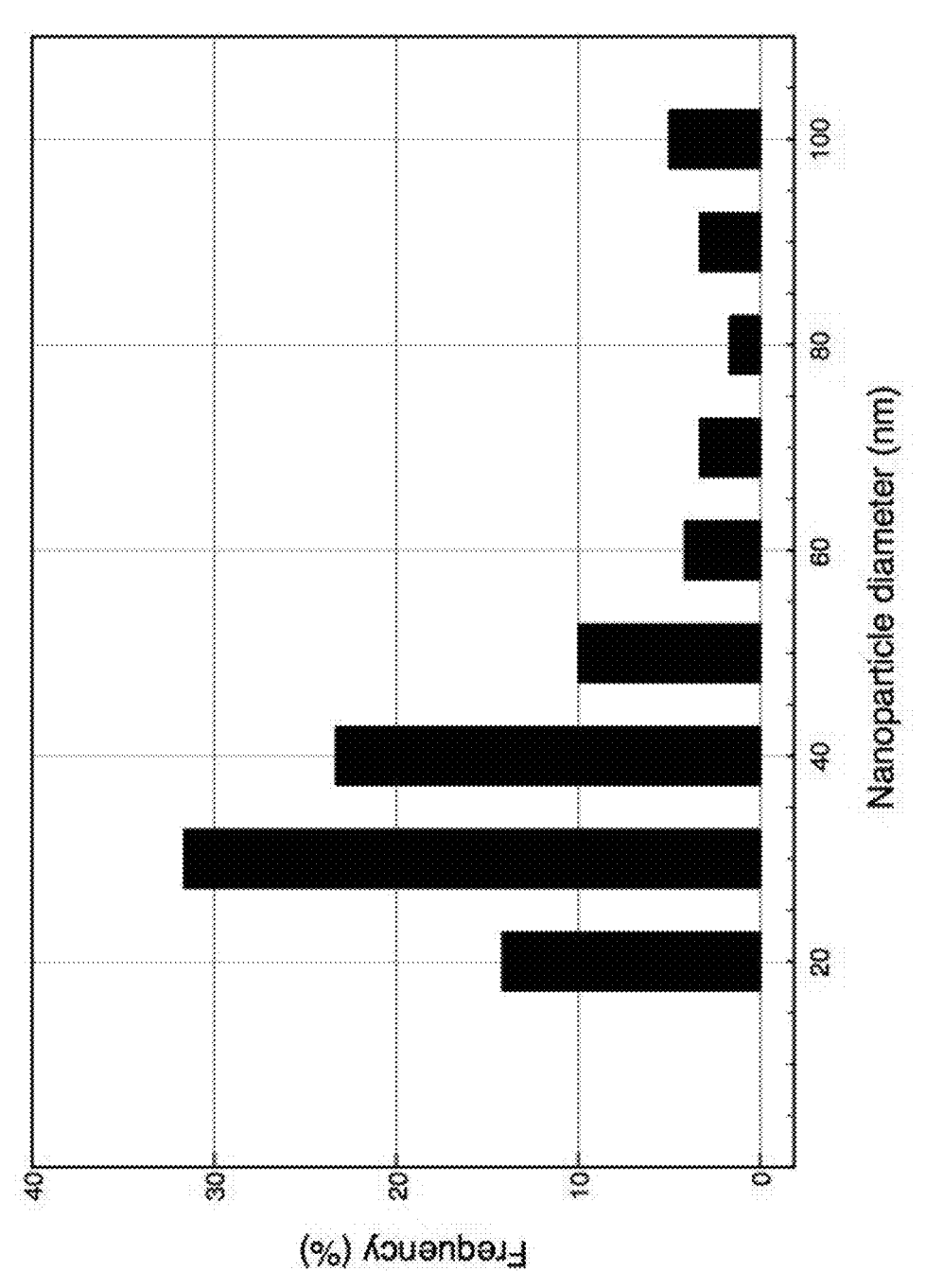
FIG. 6 is a chart illustrating the bacterial filtering efficacy of a cellulosic substrate according to an embodiment of the present disclosure.

The substrate once formed includes a plurality of metal nanoparticles in the substrate. The phrase "in the substrate" means that metal nanoparticles may found on the surface of the substrate, on the surface of the fibers, within the interstitial spaces formed by the fibrous matrix, and possibly within the fibers themselves. Once formed in substrate as described herein, the metal nanoparticles may have particle size that ranges from about 1.0 to about 200.0 nanometers (nm) in at least one dimension. It should be appreciated, however, that the metal nanoparticles described herein may be formed in aggregates that can be quite large, e.g. in the hundreds of nanometers. In one example, the size of the aggregate nanoparticles could be more than 200 nm. However, the size of discrete metal nanoparticles should be between about 1 nm to about 200 nm in diameter. In a preferred example, the size should be between about 1 nm to about 100 nm. In one example, the size of the nanoparticles is between about 1 nm to about 150 nanometers. In another example, the size of the nanoparticles is between about 1 nm to about 100 nanometers. In yet another example, the size of the nanoparticles is between about 1 nm to about 50 nanometers. It should be appreciated that methods described herein may produce a range of nanoparticle sizes, depending on processing conditions, line speeds, etc. The particle sizes may have any number of types of particle size distributions. Thus, there may be range of sizes on nanoparticles in the substrate. In one example, at least 90% of the observed particle size should be less than about 200 nm. Preferably, 90% of the observed particle size should be less than about 100 nm. FIG. 6 illustrates a particle size distribution for metal nanoparticles formed in a substrate in accordance with the inventive concepts described herein. As can be seen in FIG. 6, the particle size may range from 20 nm to about 100 nm. As noted above, however, the particle size may be less than 20 nm or greater than 100 nm.

The size of a metal nanoparticle as used herein is the size in at least one dimension observed in accordance with known image analysis methods for measuring particle sizes of nanoparticles. As illustrated, a "diameter" is used to described the dimension for ease of illustration. The term "diameter" refers to a diameter of a circle that bounds the observed particle in SEM image of the particle, as is known in the art. Use of the term diameter does not imply the metal nanoparticles are perfectly spherical structures. The mean particle size, which may also be used to refer to the size of the metal nanoparticles, is the average particle size for observed measurements in a given sample or test regimen.

The metal nanoparticles are formed from the synthesis of a metal salt and a reducing agent during a continuous process described further below. The result, however, is a substrate with metal nanoparticles. The metal nanoparticles may include silver, gold, platinum, palladium, aluminum, iron, zinc, copper, cobalt, nickel, manganese, molybdenum, cadmium, iridium, and a mixture thereof. In one example, the metal nanoparticles include silver. In another example, the metal nanoparticles include copper. Other metal nanoparticles may be used. Details concerning the precursor metal compounds used to form the metal nanoparticles are set forth below.

The substrate made in accordance with the inventive principles changes color when substantially wet. For instance, the cellulosic substrate has a first color when substantially dry and a second color when substantially wet. In this example, the second color is substantially different from the first color. The color change and type of color may depend on the metal nanoparticle used. Accordingly, it should be appreciated that either the first color or the second color may be yellow, orange, green, blue, purple, gray, black, white, or red, or any mono-chromatic variant thereof. Color can be tested using known colorimetry techniques. For instance, the color of the cellulosic substrate may have CIE L*a*b* color values measured using techniques known to a person of skill in the art. In one example, the first color (when dry) has a L* value that ranges between 45-75, an a* value between 0-40, and a b* value between 20-80. The second color may have L*a*b* color values that may fall within these ranges but still have statistically different values nonetheless.

The substrate may have a range of basis weights. For instance, the substrate has a basis weight between 30 grams per square meter (gsm) to about 400 gsm. In one example, the basis weight is between 30 gsm and 100 gsm. In one example, the basis weight is between 50 gsm and 200 gsm. In another example, the basis weight is between 100 gsm and 200 gsm. In another example, the basis weight is between 200 gsm and 300 gsm. In another example, the basis weight is between 300 gsm and 400 gsm. Basis weight as used here is measured ISO 536:2012, Paper and board—Determination of grammage, published as of the earliest filing date of the present application.

The substrate is formed using continuous processing lines as described below. In packaged form, however, the substrate may be roll goods packaged on large beams. In use, the substrate may be formed into an article that is cut to a size. For instance, the articles may be a cut paper having a length of 2-30 cm and a width that is 2-30 cm, wherein the width is perpendicular to the length. The cut article can have any shape suitable for its intended use and may not be rectilinear. Furthermore, the substrate may be formed into an article for a number of uses. The article may be used as part of a water purification device, an absorbent material, a healthcare product, or a food packaging product.

Figure 1:
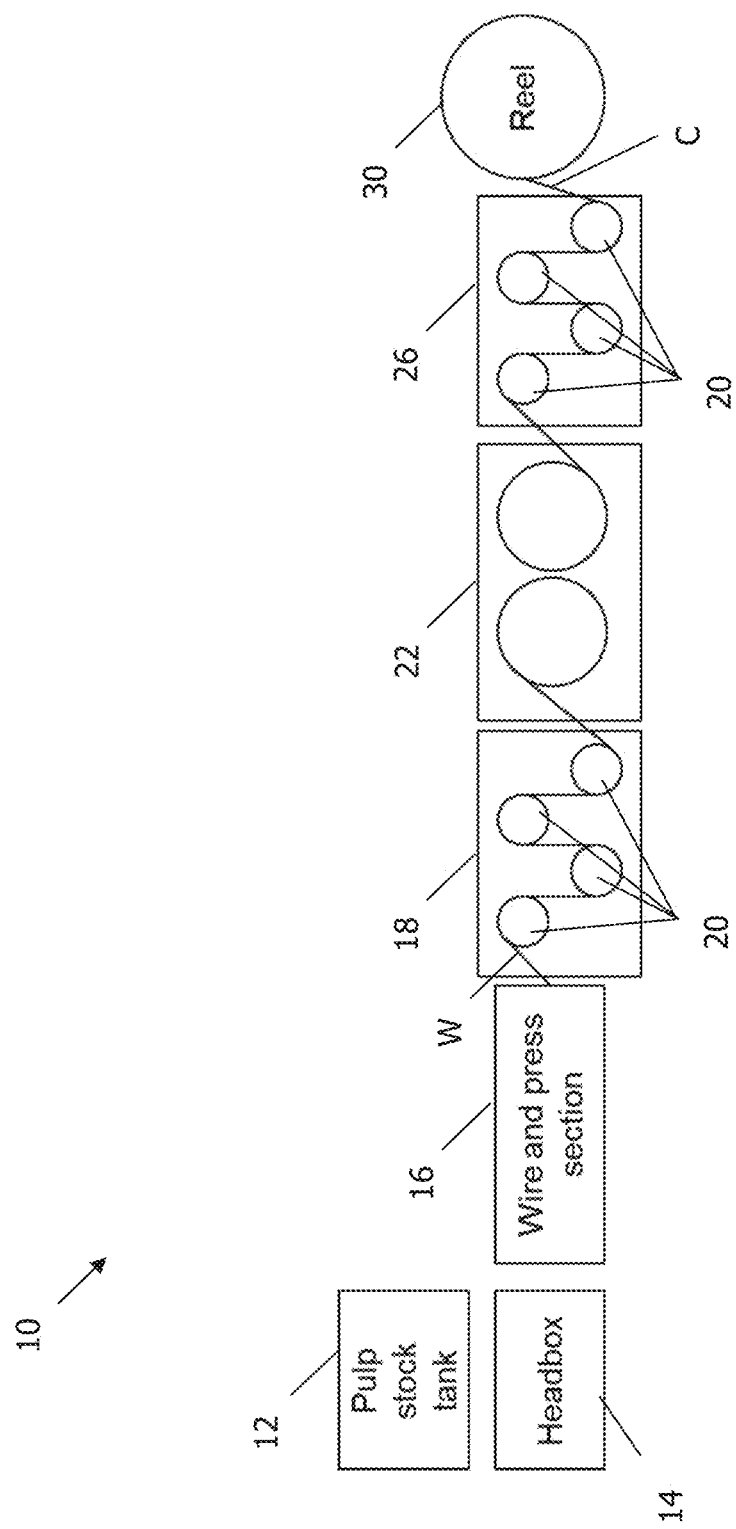
FIG. 1 is a schematic of manufacturing line for making a cellulosic substrate according to an embodiment of the present disclosure.
Figure 2:
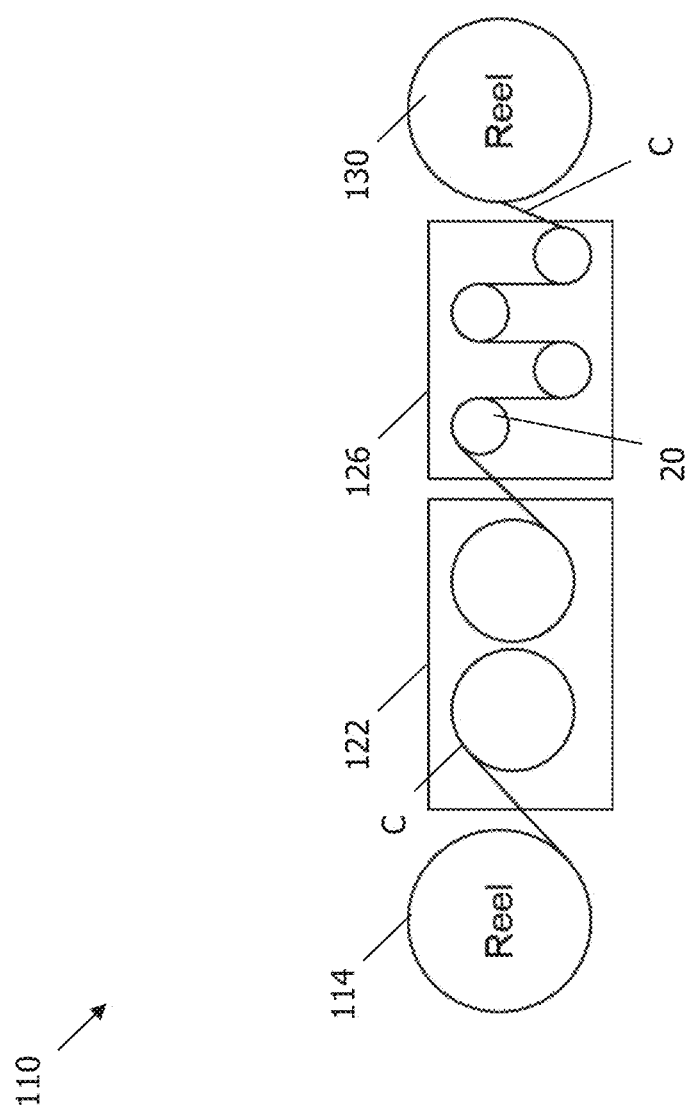
FIG. 2 is a schematic of manufacturing line for making a cellulosic substrate according to another embodiment of the present disclosure.
Figure 3:
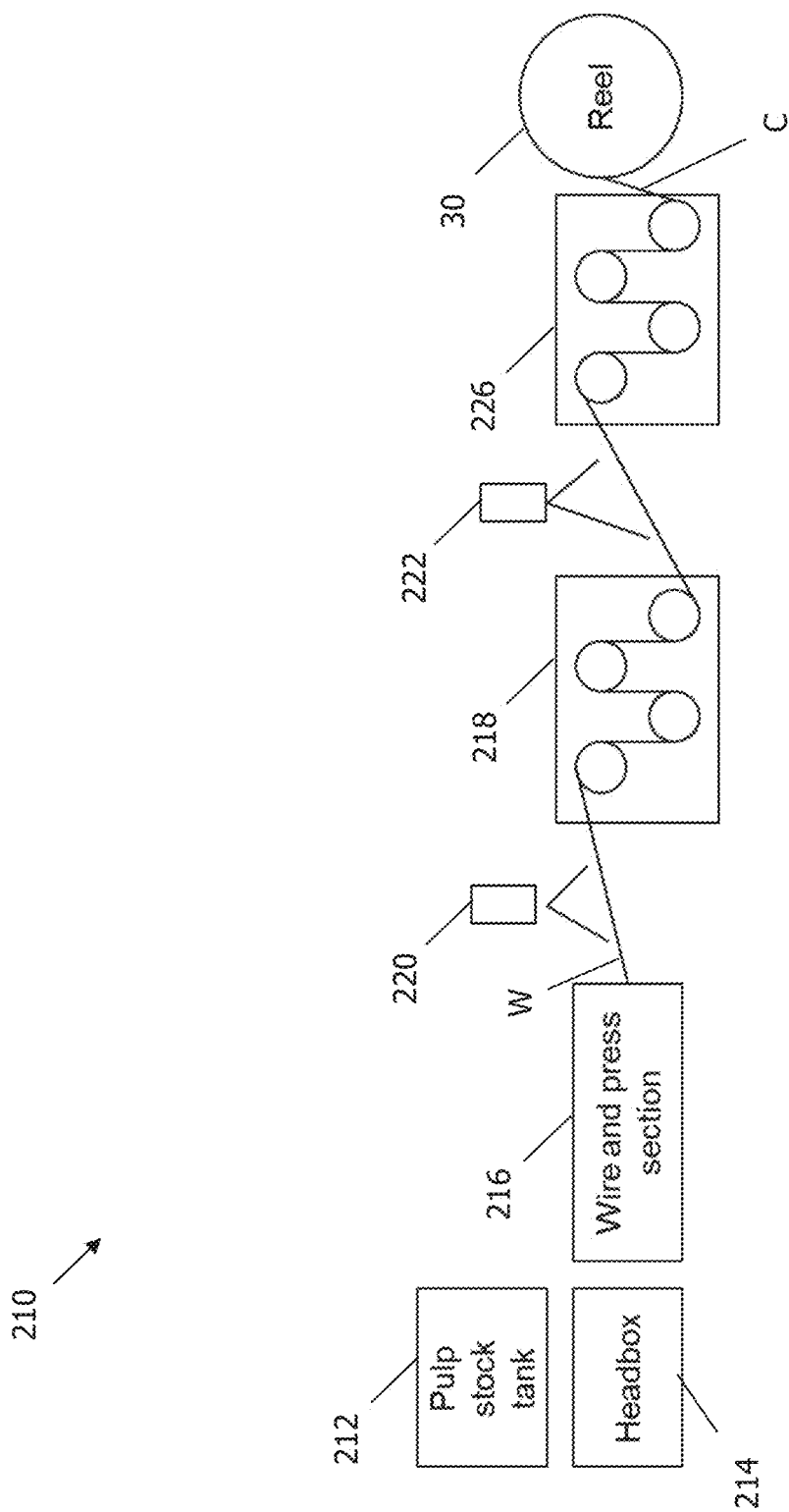
FIG. 3 is a schematic of manufacturing line for making a cellulosic substrate according to another embodiment of the present disclosure.

Referring generally to FIGS. 1-3, a continuous process is used to manufacture the cellulosic substrate with metal nanoparticles. The processes described below refers to cellulosic based processing lines for ease of illustration. However, the inventive concepts could be applied to other processes that are aqueous based or have the ability to apply aqueous compositions to materials during production. For example, wet-laid nonwoven processing lines could be adapted to include the aqueous solutions described herein. Furthermore, other nonwoven processing lines, such as spunlaced lines could be adapted to apply the aqueous solutions as described herein.

Continuing generally with FIGS. 1-3, the process includes applying an aqueous solution of nanoparticle precursors to an assembly of fibers (e.g. cellulosic fibers). In this instance, the aqueous solution of nanoparticle precursors include a metal salt and a reducing agent. The assembly of fibers may broadly encompass that state of materials at any point along the manufacturing line. For example, the aqueous solution may added to wood pulp at the initial stages of paper manufacturing, during later stages after the forming section, and/or to preformed cellulosic substrates. In one example, applying the aqueous solution to the assembly fibers includes applying the metal salt and the reducing agent in a single operation. See for example FIGS. 1 and 2. Alternatively, however, applying the aqueous solution to the assembly of fibers includes applying a first solution containing the metal salt to the assembly of fibers. Then, after applying the first solution a second solution containing the reducing agent is applied to the assembly of fibers. See for example FIG. 3. The above exemplary variations in how the aqueous solution and/or its precursors are applied to the fibers to make substrates are described further below and illustrated in FIGS. 1-3.

In most cases, however, after the aqueous solution is applied to the fibers, the process includes drying the assembly of fibers with thermal energy in a continuous operation to form the substrate. Drying gives rise to metal nanoparticles in the substrate. More specifically, for example, drying activates a chemical reaction of the metal salt and the reducing agent, thereby reducing the metal salt to the metal nanoparticles in the substrate. One skilled in the art will readily recognize that the time and temperature profile of drying phase will depend upon such varied factors as the width and basis weight (grammage) of the substrate, the water retained during application of the solution, the composition of the aqueous solutions, and desired maximum temperature reached during the drying phase.

The aqueous solution includes a metal salt and/or a reducing agent, depending on the type of process used. The metal salts include, but are not limited to silver, gold, platinum, palladium, aluminum, iron, zinc, copper, cobalt, nickel, manganese, molybdenum, cadmium, iridium, and mixtures thereof. In one example, the metal salt include silver. Typical silver salts include, but are not limited to silver nitrate, silver acetate, silver oxide, silver sulfate, silver hexafluorophosphate, silver tetrafluoroborate, silver perchlorate, silver carbonate, silver chloride, or silver trifluoromethanesulfonate. In one example, the molar concentration of such a silver salt may range between 0.05 mM to 1000 mM. A preferred range of the molar concentration may be between 1 mM to 50 mM. In one example, a typical concentration range for the application of antibacterial water filter of these silver nanoparticle impregnated cellulosic substrates can be 10 ppm to 50,000 ppm silver.

In another example, the metal salt includes copper. Copper salts may include, but are not limited to, copper acetate, copper sulfate, copper nitrate, copper oxide, copper chloride, copper carbonate, or mixtures thereof. In one example, the molar concentration of such a copper salt may range between 200 mM to 1000 mM. A preferred range of the molar concentration may be between 250 nM to 600 mM. In one example, a typical concentration range for the application of antibacterial water filter of copper nanoparticle impregnated cellulosic substrates can be 10 ppm to 150,000 ppm copper.

Several different reducing agents for metal salts may be used in the process to manufacture the substrate. Suitable reducing agents, include, but are not limited to, aldehydes and aldehyde forming chemicals. In one example, the reducing agent may be a sugar. The sugar can be a monosaccharide, disaccharide, trisaccharide, and/or a polysaccharide or some mixture thereof, including mixtures of any of the foregoing with other additives. In one example, a reducing sugar includes, but is not limited to, glucose, fructose, galactose, mannose, lactose, maltose, ribose, sorbose, and mixtures, including, but not limited to, corn syrups, glucose syrups, high fructose corn syrup, maltose syrup, and mixtures thereof. Aldehyde forming chemicals may be used. Exemplary aldehydes and aldehyde forming chemicals may include, but are not limited to, acetaldehyde, glyceraldehyde, as well as non-reducing sugars, such as sucrose, ascorbic acid, alcohol, or mixtures thereof. The reducing agent may be other compounds, such as sodium borohydride, for use on in a two-stage process. Other aldehydes and aldehyde forming chemicals and other sugar derivatives may be use together or singly to reduce the metal ions and form the nanoparticles in the substrate. In addition, any chemical that initiates Tollen's reagent, ammoniacal silver, to form a silver coating would be appropriate.

The aqueous solution may include additional agents. The additional agents may include fillers, binders, pigments, sizing agents, wet strength agents, and other common paper making additives. The additional agents may also be added to the solution to adjust certain properties of the resulting substrate. A person of ordinary skill would appreciate what additional agents may be used in addition to the nanoparticle precursors described above.

Exemplary aqueous solutions described herein may include 1 part metal salt to between 70-120 parts of a reducing agent. Such ratios may be suitable for single step application of the aqueous solution to the fibers. In example, the aqueous solution may have 1 part silver metal salt to 70 to 120 parts of s sugar, e.g. fructose, glucose, mixtures of glucose and/or fructose or other sugars. In other examples, such as when the precursors are separated into two separate phases during application. The ratio of metal salt to reducing agent may change. An exemplary two phase solution may have 1 part metal salt to 5 or more parts of a reducing agent, such as, for example, sodium borohydride FIGS. 1-3 illustrate exemplary processing lines used to form cellulosic substrates as described herein. Referring initially to FIG. 1, a paper processing line 10 is illustrated that includes a pulp stock tank 12, a head box 14, which feeds pulp into the forming section and press 16. The processing lines 10 may include a first dryer section 18, an application unit 22 (such as a size press), a second dryer section 26 and a take up reel 30 for winding up the finished the cellulosic substrate onto a heavy core to produce a roll. The pulp stock tank 12 holds wood pulp used to form the cellulosic substrate. The head box 14 provides mixing and uniform dispersion of the wood pulp and water in a pulp suspension across the width of the processing line 10. The pulp suspension is typically 0.2-0.7% solids at this point. However, higher solids values are possible. The tank 12 and head box 14 includes wood pulp, which may also be referred in the present disclosure as an assembly of cellulosic fibers.

Continuing with FIG. 1, the forming section and press 16 include a forming wire, such as a forming belt or other porous conveyer or drum. The forming wire allows water to drain from assembly of cellulosic fibers as the fibers coalesce into a web of fibers W. Vacuum boxes may be used to remove additional water. The web leaving the forming wire is typically between 15-20% solids. A wet press is used in section 16 to apply pressure to the web in order to force water into a heavy fabric (e.g. press felt). The web leaving the press section 16 at this point is typically 40-50% solids. An optional smooth press (not shown) may be used to apply pressure to further consolidate the cellulosic fiber web W.

The processing line 10 shown in FIG. 1 achieves nanoparticle synthesis with the application unit 22 and dryer sections 18 and 26. The first dryer section 18 the second dryer section 26 may include any thermal equipment used to reduce the moisture content of the web W. The dryer sections 18 and 26 may include steam-heated cylinders, gas-heated cylinders, a forced air heating machine, and/or an infrared heating unit. A steam heated system is illustrated in each dryer section and includes multiple steel drums 20 with a smooth surface, heated from the inside by condensing steam. The web W proceeds through the sections 18 following a serpentine path over and under the drums 20. The web W is typically held in place tightly against the surface of the drums 20 by a strong fabric material. The close contact between the web W and the hot surface of the drums 20 heats the web W and evaporates the remaining water. The final web is typically 90-96% solids. It should be appreciated that several methods of heating—inductive, microwave, infrared, forced air convection, gas fired or electric drying rollers—can be used to apply the heat needed to the web W to evaporate the water retained in the web W after the size press and initiate the metal reduction step that forms the nanoparticles.

The application unit 22 applies the aqueous solution of nanoparticle precursors, including the metal salt and a reducing agent, to the moving web W. The application unit 22 is located between the first and second dryer sections 18 and 26. Thus, the web W is substantially dry before the solution is applied to the web W in the application unit 22. As shown, the application unit 22 may be a size press as is known in the paper forming arts. The application unit may apply a coating to the surface of the web W by maintaining a shallow pond of the aqueous solution at the nip between two rolls, passing the paper vertically downward through the nip and allowing the web W to absorb the aqueous solution. The size press may use a tray or Dixon coater to contact web W with the aqueous solution. One of skill in the art will recognize that there are several types of application units and methods for applying an aqueous solution to the web W. For instance, application unit 22 may include, but is not limited to, spray systems, pond-style, air-knife, metering, blade-coater, and other size press applicators. Furthermore, the application unit 22 may be orientated in any direction, including vertical, horizontal, or inclined arrangements.

In the illustrated embodiment of FIG. 1, the aqueous solution applied to web W via the application unit 22 contains both (1) one or more metal salts from which the metal nanoparticle is desired and (2) one or more reducing agents as described above. In one example, the ratio of nanoparticle precursors to sizing agents in the aqueous solution may be between about 0.11100 and 1:100. In one example, the metal concentration may be between 0.05% up to about 2.0%. In another example, the metal concentration may be between 0.05% to about 1.0%. Furthermore, it should be appreciated that the solids pickup from the application unit can range from 5% to about 30%. Furthermore, the solids content at the application unit can be between 10-60%, with the majority comprising the reducing agent(s). After applying aqueous solution of metal salt and reducing agent to web W, excess solution is removed without further washing in application unit 22 (or with another piece of equipment). From the application unit 22, the web W is fed directly into a heated dryer section 26 where enough thermal energy is applied to remove the remnant moisture from the web W. In one example, the dryer section exposes the web W to temperatures in the range of 90° C. to 150° C. before the formed cellulosic substrate C exits the dryer section 26 is wound into a roll of finished cellulosic substrate by the reel 30.

Drying the assembly of cellulosic fibers W with thermal energy in a continuous operation via the dryer section 26 removes moisture but also gives rise to metal nanoparticles in the cellulosic substrate. In the dryer section 26, the thermal energy also gives rise to the visible color change in the web W from a first color, such as white, to an orange, yellow, red, purple, blue and/or green paper, indicative of various types of metal nanoparticle formed on the surface of the cellulosic substrate C. The color change may be observed via colorimetric test as described elsewhere in the present disclosure.

The processing rates during application and drying phases are significantly different than production capabilities of prior art batch methods of making nanoparticle embedded substrates. In one example, the production speeds of the processing lines described may range of 10 meters per minute up to 700 meters per minutes or higher. The amount of nanoparticle precursors applied per unit time may be between 30 grams per minute to 3,500 grams per minute, depending on the desired grammage, nanoparticle add-on, and other processing considerations. For example, the 30 grams per minute is based on a 5% weight pickup in size press on a 125 gsm paper that is traveling at 10 m/min with a web width of 0.559 m (22 inches). The 3,500 grams per minute upper bound is not limiting. For example, the 3,500 grams per minute assumes a 30% weight pickup in size press on a 270 gsm paper that is traveling at 21.33 meters per minute (70 ft/min) with a web width of 2 meters inches on a commercial paper forming line. Alternatively, the amount of metal salt pick up per unit time is typically about $\frac{1}{1000}$th of the mass of cellulosic paper produced. If for example, 1000 kg of paper is made per minute, then 1000 g of metal salt applied per minute of processing given a 0.1% metal salt concentration. The amount of metal salt picked per unit time may be higher or lower than $\frac{1}{1000}$th of the mass of cellulosic paper produced. Accordingly, the synthesis of the nanoparticles on and within cellulosic substrate occurs rapidly, unlike typical methods used to form metal nanoparticles on the cellulosic substrate.

One of skill in the art will readily recognize that many wet-end chemical additives can be mixed in with the pulp slurry in head box 14 and/or to the solution applied via the application unit 22. Wet-end chemical additives may include fillers, pigments, polyelectrolytes, internal sizing, wet strength agents, and other common paper making chemicals.

In an alternative embodiment of the processing line illustrated in FIG. 1, the aqueous solution of metal nanoparticle precursors can be applied to the assembly of cellulosic fibers separately. For instance, the processing line 10 can be modified so as to apply a first solution containing the metal salt to the cellulosic fibers in the head box 14 (or after the forming section 16). The web W is formed from the wood pulp suspension and aqueous solution via the forming and press section 16 as discussed above. The web W is then dried via the first dryer section 18. Next, the application unit 22 applies a second solution containing the reducing agent to the web of cellulosic fibers W. Then, the second dryer section 26 further dries the web W giving rise the metal nanoparticles by initiating synthesis of the metal nanoparticles on the cellulosic substrate. The formed cellulosic substrate is then wound into roll form via the reel 30.

Referring to FIG. 2, another alternative processing line 110 used for manufacturing a cellulosic substrate is illustrated. The processing line 110 illustrated in FIG. 2 is a reel-to-reel processing line. The processing line 110 includes an unwinding reel 114 holding a preformed cellulosic substrate, an application unit 122, a dryer section 126, and a take-up reel 130. In FIG. 2, the processing line 110 unwinds a roll of the preformed cellulosic substrate from the reel 114 and guides the cellulosic substrate C to application unit 122. The application unit 122 applies the aqueous solution to the containing the metal salt and the reducing agent. The application unit 122 can operate similarly to the application unit 22 described above. Next, the dryer section 126 dries the cellulosic substrate, which also initiates synthesis of the metal nanoparticles on the cellulosic substrate. The formed cellulosic substrate is wound into roll form via the reel 130. The dryer section 126 may operate similarly to the dryer sections 22 and 26 described above. It should be appreciated that ratio of nanoparticle precursors to sizing agents in the aqueous solution in this embodiment may be between about 0.11100 and 1:100. In one example, the metal concentration may be between 0.05% up to about 2.0%. In another example, the metal concentration may be between 0.05% to about 1.0%. Furthermore, the solids pickup from the application unit can range from 5% to about 30%. Furthermore, the solids content at the application unit can be between 10-60%, with the majority comprising the reducing agent(s).

In FIG. 2, it should be appreciated that the preformed substrate could be any substrate as described herein that is packaged in roll form. The preformed substrate may include a cellulosic substrate, such as paper or other cellulosic-based material, a nonwoven, a textile, or a laminate thereof. Exemplary nonwoven materials include, but are not limited to, spundbonds, meltblowns, spunbond-meltblown laminates, spun-laced nonwoven, drylaid, and/or wetlaid nonwovens. As discussed elsewhere, the preformed substrates may include a range of fibers, such as cellulosic fiber, regenerated cellulose, cellulose acetate, cellulose triacetate, glass fibers, carbon fibers, polyethylene terephthalate fibers, polypropylene fibers, and/or polyethylene fibers, blends thereof. The preformed substrate may be any material that is suitable for filter applications.

In an alternative embodiment of the processing line 110, the nanoparticle precursors are applied to the preformed cellulosic substrate separately. For instance, the application unit 122 may apply a first solution containing the metal salt to the preformed cellulosic substrate. After applying the first solution, an additional application unit (not shown) can apply a second solution containing the reducing agent to the preformed cellulosic substrate. Next, a dryer section 126 dries the cellulosic substrate to initiate synthesis of the metal nanoparticles on the cellulosic substrate. After applying the second solution to the preformed cellulosic substrate, the preformed cellulosic substrate is wound onto a roll via the reel 130

FIG. 3 illustrates another alternative embodiment of a processing line 210 used to form cellulosic substrate with metal nanoparticles. In accordance with the embodiment shown in FIG. 3, the processing line 210 applies the aqueous solution to the web of cellulosic fibers via a spraying system in a single phase or separate phases. The embodiment illustrated separates application of nanoparticle precursors. As shown in FIG. 3, the processing line 210 includes a pulp stock tank 12, a head box 214, forming section and press 216, a first spray application unit 220, a first dryer section 218, a second spray application unit 222, a second dryer section 226 and a take up reel 230. The pulp stock tank 212, a head box 214, forming section and press 216, first dryer section 218, second dryer section 226 and a take up reel 230 are substantially similar to the corresponding components of processing line 10 shown in FIG. 1. As shown in FIG. 3, the first spray application unit 220 sprays a first solution containing the metal salt on the web of cellulosic fibers W. The first dryer section dries the web W. Next, the second application unit 222 sprays a second solution containing the reducing agent onto web of cellulosic fibers W. The second dryer section 226 then dries the web W.

The processing line 220 shown in FIG. 3 achieves nanoparticle synthesis with the application unit 122 and dryer section 226. Specifically, application unit 122 applies the aqueous solution of nanoparticle precursors, including the reducing agent, to the web which may already contain the metal salt from previous spray application. After applying the second aqueous solution containing the reducing agent to web W, thermal energy is applied via the dryer section 226. It should be appreciated that ratio of nanoparticle precursors to sizing agents in the aqueous solution in this embodiment may be between about 0.11100 and 1:100. In one example, the metal concentration may be between 0.05% up to about 2.0%. In another example, the metal concentration may be between 0.05% to about 1.0%. Furthermore, the solids pickup from the application unit can range from 5% to about 30%. Furthermore, the solids content at the application unit can be between 10-60%, with the majority comprising the reducing agent(s). The dryer section exposes the web W to temperatures in the range of 90° C. to 150° C. before the formed cellulosic substrate C exits the dryer section 226 and is wound into a roll of finished cellulosic substrate by the reel 230. Drying the assembly of cellulosic fibers W with thermal energy in a continuous operation via the dryer section 226 removes moisture but also gives rise to metal nanoparticles in the cellulosic substrate, as described above.

Regardless of the processing line 10, 110 and 210 uses, the formed cellulosic substrate can be shipped in roll form, stored, or immediately cut to make individual use metal nanoparticle embedded paper filters and/or other cellulosic articles as described herein. One skilled in the art will readily recognize that such a product could also be used without being cut for a number of other operations beyond the production of pre-cut water filters. Accordingly, the metal nanoparticle embedded cellulosic substrates can be used for water purification, healthcare products, absorbance products, food packaging, and a mixture thereof. For many of the applications of these papers, the durability and longevity of antibacterial functionality is a requirement.

The inventive concepts and uses are further exemplified by way of the following non-limited examples.

Example A

Figure 4:
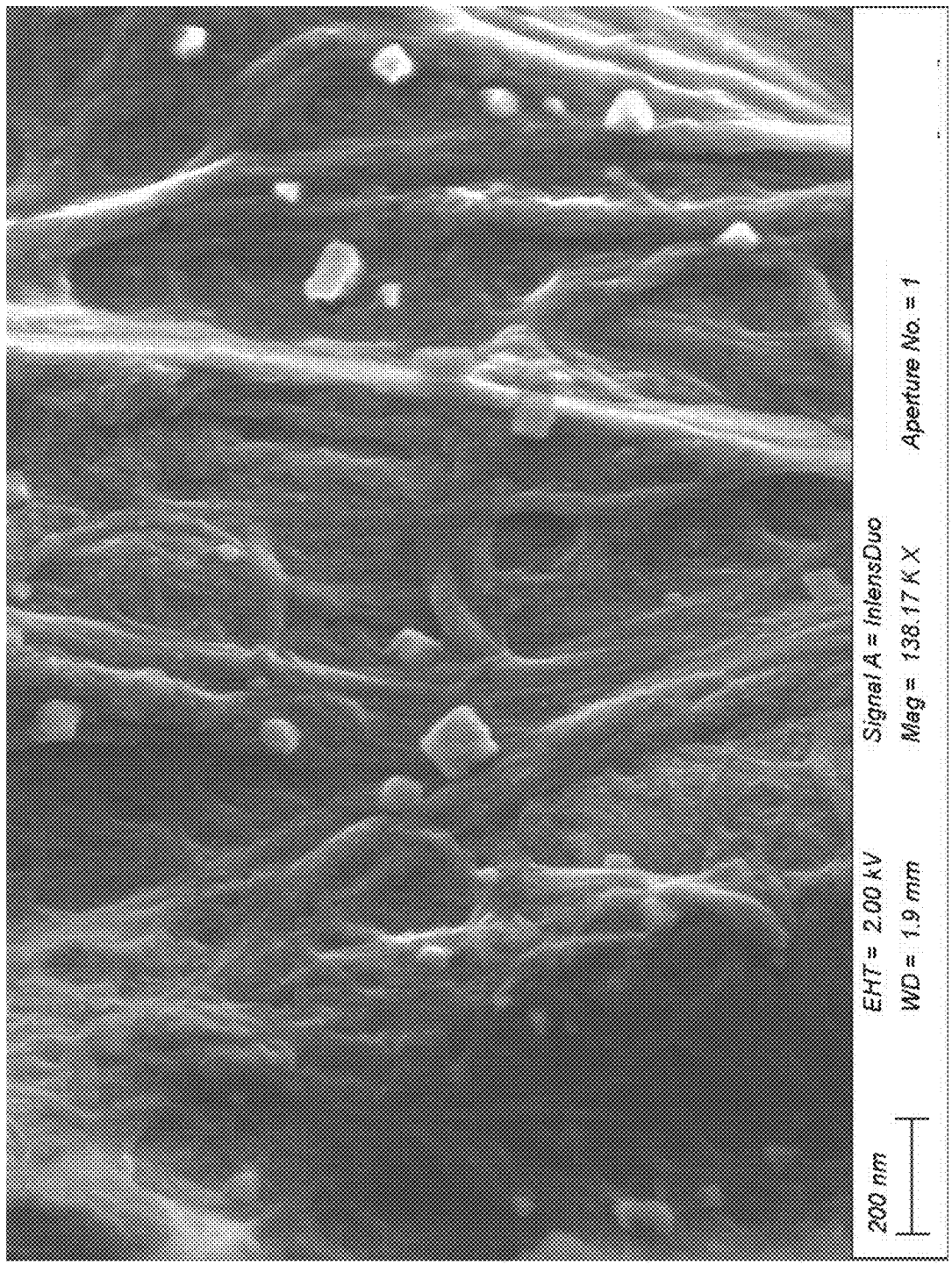
FIG. 4 is an SEM image of a cellulosic substrate according to an embodiment of the present disclosure.

Example A included production of silver nanoparticles on a cellulose substrate in a pilot paper production line. In example A, about 138 kg of wood pulp was mixed with water in the pulp stock tank to achieve a solids content of approximately 1.0%. The pulp slurry was fed through the head box and onto the forming table, through the wet presses and the first dryer section. The paper web proceeded through the size press with an aqueous solution of 0.04 M silver nitrate and 3 M reducing sugars. The sugars in this example was a mixture of glucose and fructose. The web picked up nanoparticle precursors. In the second dryer section, the silver nitrate was reduced to silver nanoparticles by the combination of heating and glucose reduction. The web turned from a substantially white color to an orange color in the second dryer section, indicative of silver nanoparticle formation. The residual time of the web in the second dryer section necessary to form an uniformly colored sheet containing silver nanoparticles was around 40 seconds. Table 1 below shows the colorimetric changes from a white web to an orange colored web in the paper by CIE-Lab analysis, where L* represents light to dark (100 to 0), a* represents green to red (negative to positive), and b* represents blue to yellow (negative to positive). The pilot machine operated at approximately 9.75 m/min and produced 154 kg of silver nanoparticle embedded paper in 1.75 hours. The size of the nanoparticles was 20-100 nm as shown in FIG. 4.

TABLE 1

| Sample | L* | a* | b* |
|---|---|---|---|
| White Paper | 95.3 | 1.2 | 2.5 |
| Pilot Machine production | 66.2 | 18.0 | 36.5 |

Example B

Example B illustrates the antibacterial properties of paper machine produced silver nanoparticle filter papers. The silver nanoparticle embedded papers from Example A were evaluated for bactericidal effectiveness by a simple water filter test, as previously detailed (Dankovich and Gray, 2011). Non-pathogenic *Escherichia coli* bacteria, which are indicators of faecal contamination, were used as the test bacteria. Suspensions containing $1.95 \times 10^{\wedge}6$ colony forming units (CFU/mL) of *E. coli* bacteria in distilled water were passed through a 24.77 cm diameter paper folded into a cone, supported by a funnel. A sample of effluent water was analyzed for viable bacteria by plating a 100 microliter aliquot on nutrient agar plates and incubating at 37° C. for 24 hours. 90 liters of *E. coli* suspensions were passed through the silver nanoparticle papers and 4 samples were taken every 2 to 6 liters of water throughput. Bacterial reduction percentage were calculated according to Equations 1 and 2 and in Table 2:

$$\text{Bacteria Reduction \%} = (100)(\text{influent} - \text{effluent})/(\text{influent}) \quad \text{(Equation 1)}$$

$$\text{Log Reduction} = -\log(1 - \text{bacteria reduction \%}) \quad \text{(Equation 2)}$$

Figure 5:
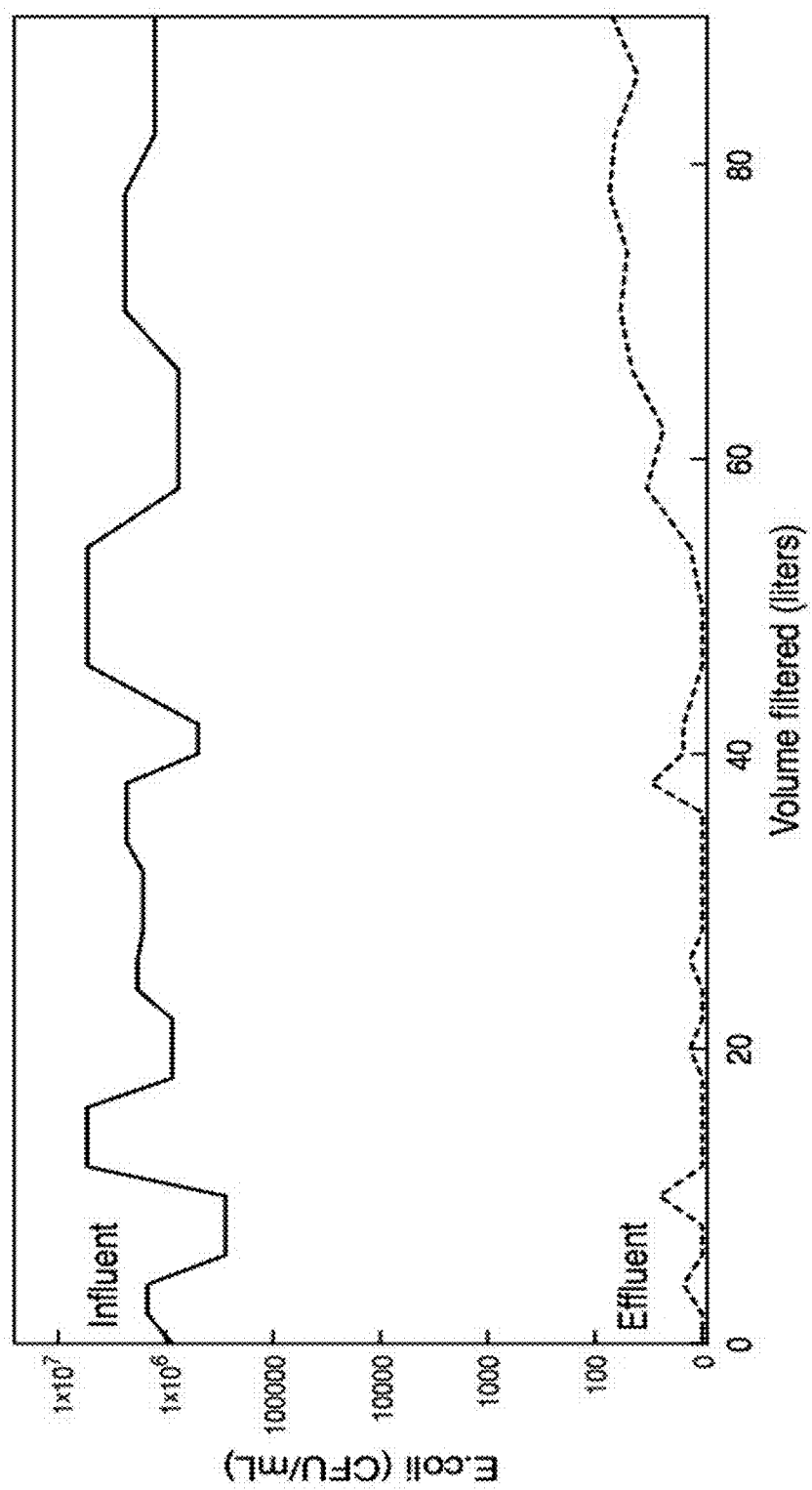
FIG. 5 is a chart illustrating the particle size distribution of nanoparticles formed in the cellulosic substrate according to an embodiment of the present disclosure.

In bacteria stress tests, it has been demonstrated that the silver nanoparticle paper produced via pilot scale paper machine production can eliminate an average of 99.998% *E. coli* bacteria (5.2 log reduction) with a capacity of around 90 L (Table 2). The influent (pre-filtration) and effluent (post-filtration) *E. coli* bacteria counts were plotted in FIG. 5. Table 2 below illustrate the bacteria and log reductions with respect to the volume of $1.95 \times 10^{\wedge}6$ colony forming units (CFU/mL) of *E. coli* filtered through the silver nanoparticle papers formed in example A.

TABLE 2

| Volume filtered (L) | Bacteria Reduction (%) | Log Reduction |
| --- | --- | --- |
| 0 | 99.999% | 5.17 |
| 10 | 99.999% | 5.01 |
| 20 | 99.996% | 5.52 |
| 30 | 99.999% | 5.49 |
| 40 | 99.998% | 5.48 |
| 50 | 99.999% | 5.47 |
| 60 | 99.998% | 5.14 |
| 70 | 99.996% | 4.46 |
| 80 | 99.997% | 4.60 |
| 90 | 99.995% | 4.35 |

The continuous processes as described herein have number of advantages over the batch processes. For instance, in contrast to the batch methods described above, the continuous processes as described herein allows large quantities of nanoparticle embedded paper to be produced in a matter of minutes. The continuous processes as described herein may utilize, for example, Dixon Coater, a Fourdrinier pilot machine and other commercial large-scale paper forming lines. A comparatively small Dixon coater, for example, coats and dries at 12 inch roll of paper at 280 linear feet of paper per minute (ft/min) running at full speed. A Fourdrinier pilot machine can produce speeds, which typically range from 10 ft/min to 300 ft/min, that far outstrip the levels of production possible in previously disclosed inventions (Dankovich, 2015). Larger, commercial paper forming lines are capable of even higher throughput, typically in the range of 500 ft/min to 2500 ft/min. The previously disclosed conventional batch methods for nanoparticle synthesis have not been readily adapted to this powerful technology, and thus they have not been widely adopted.

Rather than synthesizing metal nanoparticles in individual filter sheets, as previously described (Dankovich, 2014) in batch methods, the present disclosure includes a continuous manufacture of bulk quantities of metal nanoparticles directly on the cellulosic substrate. From the formed substrates, filters may be cut to size using standard sheeting equipment. Thus, embodiments described herein include methods for synthesizing metal nanoparticles within cellulosic substrates in seconds rather than minutes or hours as compared to batch methods. The result is a significant increase in production speeds that yield metal nanoparticles embedded cellulosic materials. Furthermore, the inventive concepts described herein do not significantly alter the surface chemistry of pulp or paper during the wet formation of the cellulosic substrate. Furthermore, the processes as described herein do not significantly alter the physical properties of the resultant cellulosic substrate as compared to the same process without the nanoparticle synthesis step. The in situ method to form nanoparticles directly on the fiber surfaces has a few other advantages over previous batch methods. For example, the overall levels of metal nanoparticles that can be formed and retained in the cellulosic substrate is much higher with an in situ synthesis process as described herein, at least compared to the absorption process of the nanoparticles (Dankovich and Gray, 2011). In situ synthesis methods as described herein can prevent of the excessive losses of expensive metal reagents during manufacturing processes and product usage phases. There may be little to no loss of metal precursors in this manufacturing process due to the re-circulation of the solution in the application unit.

The following definitions set forth below apply to the present disclosure.

The articles "a" and "an" are used herein to refer to one or to more than one (i.e., to at least one) of the grammatical object of the article. By way of example, "an element" means one element or more than one element.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. Numerical ranges recited herein by endpoints include all numbers and fractions subsumed within that range (e.g., 1 to 5 includes 1, 1.5, 2, 2.75, 3, 3.90, 4, and 5). The upper and lower limits of these smaller ranges may independently be included in the smaller ranges and are encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about". The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number. For example, the term "about" is used herein to modify a numerical value above and below the stated value by a variance of 5%.

As used in the specification and the appended claims, the terms "for example," "for instance," "such as," "including" and the like are meant to introduce examples that further clarify more general subject matter. Unless otherwise specified, these examples are provided only as an aid for understanding the invention, and are not meant to be limiting in any fashion.

The terms "antimicrobial" or "antimicrobial activity" as used herein refer to a process or activity that has an antimicrobial effect, either by physical nature or by a chemical nature, including killing microorganisms, inhibiting growth of microorganisms, or removing the microorganism. The terms "antibacterial", "anti-fungal", etc. can be considered in the same manner. The activity is also to be considered in light of the context of the specification and claims as written While the disclosure is described herein using a limited number of embodiments, these specific embodiments are not intended to limit the scope of the disclosure as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

The invention claimed is:

1. A method for forming a substrate in a continuous operation, the method comprising:
    passing, in a first phase of the continuous operation, a planar cellulosic substrate through an aqueous solution of nanoparticle precursors, wherein the planar cellulosic substrate has a basis weight of up to 300 grams per square meter, wherein the aqueous solution has a solids content of 7-60% solids, the nanoparticle precursors are applied to the planar cellulosic substrate between 30 grams per minute to 3,500 grams per minute for the basis weight between 30 and 300 grams per square meter, and the solids pickup is between 5% to about 30%, and wherein the nanoparticle precursors include a metal salt having a concentration of 10-150,000 ppm and a reducing agent and the aqueous solution does not include metal nanoparticles; and after the first phase of the continuous operation, drying, in a second phase of the continuous operation, to expose the planar cellulosic substrate to temperatures of at least 90° C. in order to form metal nanoparticles directly on surfaces of cellulosic fibers of the planar cellulosic substrate, wherein the metal nanoparticles have a size that ranges from 1 to about 200 nanometers in at least one dimension.

2. The method of claim 1, wherein the size of the metal nanoparticle ranges from about 1 to about 100 nanometers in at least one dimension.

3. The method of claim 1, wherein the size of the metal nanoparticle ranges from about 1 to about 50 nanometers in at least one dimension.

4. The method of claim 1, wherein the size of the metal nanoparticle ranges from about 50 to about 200 nanometers in at least one dimension.

5. The method of claim 1, wherein the size of the metal nanoparticle ranges from about 100 to about 200 nanometers in at least one dimension.

6. The method of claim 1, wherein the size of the metal nanoparticle ranges from about 150 to about 200 nanometers in at least one dimension.

7. The method of claim 1, wherein the metal salt includes at least one of: silver, gold, platinum, palladium, aluminum, iron, zinc, copper, cobalt, nickel, manganese, molybdenum, cadmium, iridium, and a mixture thereof.

8. The method of claim 1, wherein the metal salt includes silver.

9. The method of claim 1, wherein the metal salt is silver nitrate, silver acetate, silver oxide, silver sulfate, silver hexafluorophosphate, silver tetrafluoroborate, silver perchlorate, silver carbonate, or silver chloride.

10. The method of claim 1, wherein the metal salt includes copper.

11. The method of claim 1, wherein the metal salt is copper acetate, copper sulfate, copper nitrate, copper oxide, copper chloride, copper carbonate, or a mixture thereof.

12. The method of claim 1, wherein the reducing agent is a sugar.

13. The method of claim 12, wherein sugar is at least one of: glucose, fructose, galactose, mannose, lactose, maltose, disaccharides, trisaccharides, corn syrups, glucose syrups, high fructose corn syrup, maltose syrup, and a mixture thereof.

14. The method of claim 1, wherein the reducing agent is an aldehyde forming chemical.

15. The method of claim 1, wherein the reducing agent is sodium borohydride.

16. The method of claim 1, wherein drying activates a chemical reaction of the metal salt and the reducing agent, thereby reducing the metal salt to the metal nanoparticles in the substrate.

17. The method of claim 1, wherein drying the planer cellulosic substrate includes drying with a) steam-heated or gas-heated cylinders of a paper machine, b) a forced air heating machine, or c) irradiation through IR heaters.

18. The method of claim 1, wherein prior to drying, the planer cellulosic substrate is a preformed web of cellulosic fibers.

19. The method of claim 18, wherein applying the aqueous solution includes contacting the planer cellulosic substrate with the aqueous solution in an application unit of a paper machine.

20. The method of claim 18, wherein applying the aqueous solution includes contacting the planer cellulosic substrate with the aqueous solution in an application unit that is not part of a paper machine that made the cellulosic substrate.

21. The method of claim 1, wherein prior to drying, the planer cellulosic substrate is a preformed substrate.

22. The method of claim 21, further comprising:
unwinding a roll of the preformed substrate before applying the aqueous solution to the preformed cellulosic substrate.

23. The method of claim 19, further wherein the solids pickup in the application unit is between 5% to about 30%.

24. The method of claim 1, further wherein processing speeds are between 10 meters per minute up to about 700 meters per minute.

25. A method, comprising:
unwinding a preformed roll of a planar cellulosic substrate having cellulosic fibers from an unwinding reel;
passing the preformed roll of the planar cellulosic substrate through an aqueous solution of nanoparticle precursors held in tray or at one or more nips of a coating machine in a continuous coating operation at a speed between about 10 meters per minute up to about 700 meters per minute, the preformed cellulosic substrate having a basis weight between 30 grams per square meter and 400 grams per square meter, wherein the aqueous solution of nanoparticle precursors a) is applied to the preformed cellulosic substrate between 30 grams per minute to 3,500 grams per minute for the basis weight between 30 and 400 grams per square meter, b) has a solids content of 7-60% solids, and c) the solids pickup is between 5% to about 30%, wherein the nanoparticle precursors include a metal salt having a concentration of 10-150,000 ppm and a reducing agent and wherein the aqueous solution does not include metal nanoparticles; and after passing the preformed roll of the planar cellulosic substrate into the aqueous solution, continuously drying the preformed cellulosic substrate with the aqueous solution coated thereon to expose the coated planar cellulosic substrate to temperatures of at least 90° C. in order to form metal nanoparticles on the surface of the cellulosic fibers of the preformed cellulosic substrate, wherein the metal nanoparticles have a size that ranges from 1 to about 200 nanometers in at least one dimension; and winding the coated preformed cellulosic substrate into a roll on a take-up reel.

26. The method of claim 25, further comprising: unwinding a roll of the preformed substrate before applying the aqueous solution to the preformed cellulosic substrate.

27. The method of claim 26, wherein applying the aqueous solution to the preformed substrate includes:
applying a first solution containing the metal salt to the preformed substrate; and
after applying the first solution, applying a second solution containing the reducing agent to the preformed substrate.

28. The method of claim 25, wherein drying activates a chemical reaction of the metal salt and the reducing agent, thereby reducing the metal salt to the metal nanoparticles in the cellulosic substrate.

29. The method of claim 25, wherein the metal salt includes silver.

30. The method of claim 25, wherein the metal salt includes copper.

31. The method of claim 25, wherein the cellulosic substrate with the metal nanoparticles has a CIE L*a*b* color value, where the L* value is between 45-75, the a* value is between 0-40, and the b* value is between 20-80, wherein the cellulosic substrate with the metal nanoparticles has a first color with a first CIE L*a*b* color value when substantially wet and a second color with a second CIE L*a*b* color value when substantially dry, such that the first CIE L*a*b* color value of the first color is substantially different from the second CIE L*a*b* color value.

32. The method of claim 25, wherein the aqueous solution has a solids content of 10-60% solids.

33. The method of claim 1, wherein molar concentration of the metal salt in the aqueous solution is between 1 mM to 200 mM.

34. The method of claim 25, wherein molar concentration of the metal salt in the aqueous solution is between 1 mM to 200 mM.

35. The method of claim 1, wherein applying the aqueous solution of nanoparticle precursors to the planer cellulosic substrate does not include electro-spraying.

36. The method of claim 1, wherein loss of metal salt is minimized or eliminated due to a recycling operation.

37. The method of claim 1, wherein the metal nanoparticles are formed on the surfaces of the fibers of the cellulosic substrate in situ only during drying operation.

38. The method of claim 25, wherein the metal nanoparticles are formed on the surfaces of the fibers of the cellulosic substrate in situ only during drying operation.

39. The method of claim 1, wherein the aqueous solution is 1 part metal salt to 70-120 parts reducing agent.

40. The method of claim 25, wherein the aqueous solution is 1 part metal salt to 70-120 parts reducing agent.

* * * * *